US006277343B1

(12) United States Patent
Gansley et al.

(10) Patent No.: US 6,277,343 B1
(45) Date of Patent: Aug. 21, 2001

(54) FLUE GAS SCRUBBING METHOD AND APPARATUS THEREFOR

(75) Inventors: Raymond R. Gansley, Lebanon; Michael L. Mengel, Fredericksburg, both of PA (US)

(73) Assignee: Marsulex Environmental Technologies, LLC, Lebanon, PA (US)

( * ) Notice: Subject to any disclaimer, the term of this patent is extended or adjusted under 35 U.S.C. 154(b) by 0 days.

(21) Appl. No.: 09/404,563

(22) Filed: Sep. 23, 1999

(51) Int. Cl.[7] .......................... B01D 53/40; B01D 53/50; B01J 19/00
(52) U.S. Cl. .............. 423/210; 423/243.01; 423/243.03; 423/243.06; 423/240 R; 422/168; 422/234; 422/236
(58) Field of Search ........................ 423/243.06, 243.03, 423/243.01, 210, 240 R; 422/168, 234, 236

(56) References Cited

U.S. PATENT DOCUMENTS

| 3,971,642 | 7/1976 | Perez ........................................ 55/223 |
| 4,248,842 | * 2/1981 | Kaupisch et al. ..................... 423/242 |
| 4,690,807 | 9/1987 | Saleem .................................. 423/242 |
| 5,512,072 | 4/1996 | Laslo ...................................... 55/250 |
| 5,665,317 | 9/1997 | Laslo .................................... 422/171 |
| 5,779,999 | * 7/1998 | Laslo .................................... 423/210 |

FOREIGN PATENT DOCUMENTS

| 682972A2 | 11/1995 | (EP) ............................... B01D/53/50 |
| 2154468 | * 9/1985 | (GB) ................................. 423/243.03 |
| 96/14138 | 5/1996 | (WO) ............................ B01D/53/50 |
| 2296490 | 7/1996 | (WO) ............................ B01D/53/34 |

* cited by examiner

Primary Examiner—Steven P. Griffin
Assistant Examiner—Timothy C. Vanoy
(74) Attorney, Agent, or Firm—Gary M. Hartman; Domenica N.S. Hartman

(57) ABSTRACT

An apparatus and process for removing acidic gases, such as sulfur dioxide, hydrogen chloride and hydrogen fluoride, from flue gases produced by processing operations of the type carried out in utility and industrial plants. The apparatus is generally a gas-liquid contactor whose operation uses an ammonium sulfate-containing scrubbing solution to absorb acidic gases from flue gases, and into which oxygen and ammonia are then injected to react with the absorbed sulfur dioxide to produce ammonium sulfate as a valuable byproduct. The oxygen and ammonia are not introduced together into the scrubbing solution, but instead are introduced sequentially and in a manner so that the oxidation first occurs in a relatively low pH solution as a result of the absorbed acidic gases. The ammonia is then added to the solution in a manner that inhibits or prevents intermixing of the ammonia with the majority of the solution, but is present in the solution when recycled for further absorption of acidic gases. This is accomplished by providing a partition within a vessel containing the scrubbing solution, so that two volumes are defined within the vessel. The portion of the solution within one of the volumes receives oxygen. The solution is then drawn into the other volume, which ammonia is introduced. By avoiding the injection of ammonia into that portion of the solution that receives oxygen, which is at a lower pH and contains lower levels of ammonium sulfite, high ammonia vapor pressure and ammonia slip are minimized. By avoiding the injection of oxygen into that portion of the solution that receives ammonia, bubbles normally present in the scrubbing solution due to the injection of oxygen are prevented from being drawn into that portion of the solution that is in the process of being recycled for further absorption of acidic gases.

17 Claims, 3 Drawing Sheets

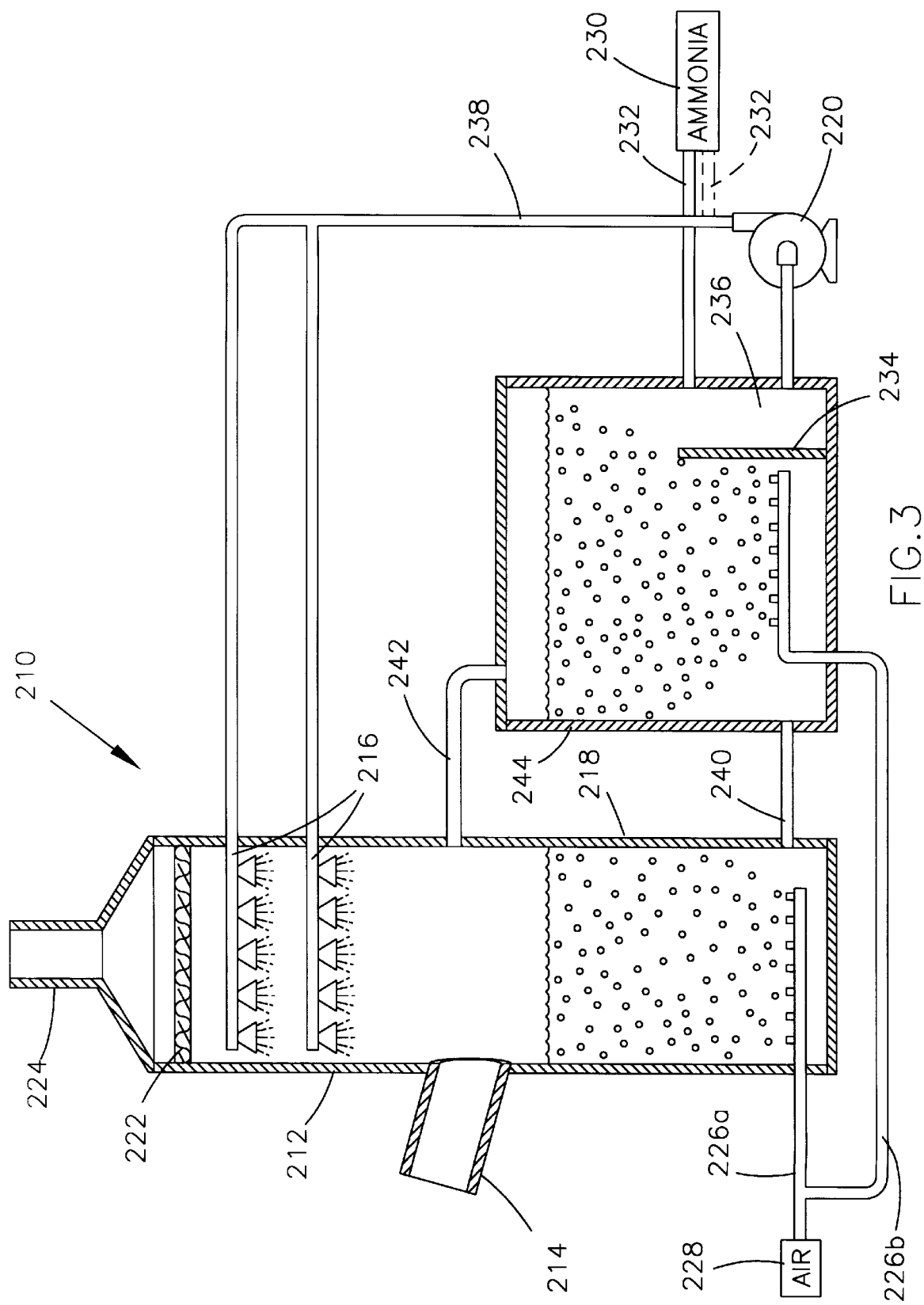

FLUE GAS SCRUBBING METHOD AND APPARATUS THEREFOR

BACKGROUND OF THE INVENTION

1. Field of the Invention

This invention generally relates to gas-liquid contactors used in the removal of acidic gases, such as from utility and industrial flue gases. More particularly, this invention is directed to a wet flue gas desulfurization process and apparatus that uses an ammonia-containing scrubbing solution to remove sulfur dioxide and other acidic gases from flue gases, promotes the oxidation rate of the scrubbing solution to produce ammonium sulfate, and reduces the presence of free ammonia in the scrubbed flue gases.

2. Description of the Prior Art

Gas-liquid contactors are widely used to remove substances such as acidic constituents and particulate matter from combustion or flue gases produced by utility and industrial plants. Often of particular concern is sulfur dioxide ($SO_2$) produced by the combustion of fossil fuels and various industrial operations. Acidic gases are known to be hazardous to the environment, such that their emission into the atmosphere is closely regulated by clean air statutes. The method by which acidic gases are removed with a gas-liquid contactor or other type of flue gas scrubber is known as wet flue gas desulfurization (FGD).

The cleansing action produced by gas-liquid contactors and absorbers is generally derived from the passage of gas through a tower cocurrently or countercurrently to a descending liquid that absorbs the acidic gases. A known configuration for a gas-liquid contactor 10 is shown in FIG. 1 as including an absorber tower 12 equipped with an inlet duct 14 through which combustion gases enter the tower 12. Shown above the inlet duct 14 are two banks of spray headers 16 which introduce a contact medium, e.g., an alkaline slurry or solution, into the tower. Calcium-based slurries, sodium-based solutions and ammonia-based solutions are typical alkaline scrubbing liquids used in flue gas scrubbing operations. Additional banks of spray headers can be provided as may be required for a given application. A pump 20 recycles the contact medium from a tank 18 at the bottom of the tower 12 to the spray headers 16. Intimate contact between the contact medium and the flue gases rising through the tower 12 results in a cleansing action, after which the contact medium and the entrapped or reacted gases are collected in the tank 18 at the bottom of the tower 12. The cleansed gases continue to rise through the tower 12, then typically pass through a mist eliminator 22 and thereafter are either heated or passed directly to the atmosphere through an outlet duct 24.

While gas-liquid contactors and absorbers utilizing calcium-based slurries generally perform satisfactorily, their operation results in the production of large quantities of wastes or gypsum, the latter having only nominal commercial value. In contrast, ammonia-based scrubbing processes have been used in the art to produce a more valuable ammonium sulfate fertilizer, as taught by U.S. Pat. Nos. 4,690,807 and 5,362,458, each of which are assigned to the assignee of the present invention. In these processes, as the flue gases flow upward through the tower 12, acidic gases present in the gases are absorbed by an ammonium sulfate solution containing ammonia. Afterwards, the solution is accumulated in the tank 18, where the absorbed sulfur dioxide reacts with the ammonia to form ammonium sulfite ($(NH_4)_2SO_3$ and ammonium bisulfite ($NH_4HSO_3$), which are oxidized in the presence of sufficient oxygen to form ammonium sulfate and ammonium bisulfate ($NH_4HSO_4$), the latter of which reacts with ammonia to form additional ammonium sulfate. As shown in FIG. 1, oxygen and ammonia for these reactions are injected together into the tank 18 via a single conduit 26. A suitable source 28 for oxygen is air, and a suitable source 30 for ammonia is an anhydrous or aqueous ammonia solution. A portion of the ammonium sulfate solution and/or ammonium sulfate crystals that form in the solution can then be drawn off to yield the desired byproduct of this reaction. A sufficient amount of ammonium sulfate is preferably removed from the ammonium sulfate solution prior to delivery to the tower 12 in order to maintain ammonium sulfate at a desired concentration in the solution.

In addition to being required to react with sulfur dioxide to produce ammonium sulfate, ammonia also serves to increase the efficiency of sulfur dioxide removal by reducing the acidity of the ammonium sulfate solution introduced into the tower 12. With the absorption of sulfur dioxide in the tower 12, the ammonium sulfate solution becomes more acidic and its ability to absorb sulfur dioxide is reduced. For example, without added ammonia the pH of the ammonium sulfate solution is generally in the range of about 4 and 5.5, but with added ammonia the solution generally has a pH of around 5 to 6, depending on control set points and operating conditions, including the $SO_2$ concentration in the flue gas. However, oxidation of an ammonium sulfite solution is slower with higher pH levels.

Higher pH levels are also associated with the release of free ammonia from the solution, often termed "ammonia slip." In addition to incurring an economic loss because of lost ammonia, free ammonia in the scrubbed flue gases reacts with uncaptured sulfur dioxide and trioxide to create an ammonium sulfate aerosol that is visible as a blue or white plume in the stack discharge, leading to secondary pollution problems. Controlling the amount of free ammonia in the desulfurization process is in part a function of the ammonia vapor pressure, which results from a combination of pH and levels of unoxidized ammonium sulfite that remain in the absence of sufficient oxygen. Therefore, high pH values and high levels of unoxidized ammonium sulfite promote ammonia slip.

In view of the above, an ongoing demand of desulfurization processes using ammonium sulfate scrubbing solutions is the ability to achieve efficient oxidation rates while reducing the release of free ammonia.

SUMMARY OF THE INVENTION

The present invention provides an apparatus and process for removing acidic gases from flue gases produced by processing operations of the type carried out in utility and industrial plants. The apparatus is generally a gas-liquid contactor whose operation uses an ammonium sulfate-containing scrubbing solution to absorb acidic gases from flue gases, and into which oxygen and ammonia are then injected to react with the absorbed sulfur dioxide to produce ammonium sulfate as a valuable byproduct. According to the invention, the oxygen and ammonia are not introduced together into the scrubbing solution as done in the prior art, but instead are introduced sequentially and in a manner so that the oxidation first occurs in a relatively low pH solution as a result of the absorbed acidic gases. The ammonia is then added to the solution in a manner that inhibits or prevents intermixing of the ammonia with the majority of the solution, but is present in the solution when recycled for further absorption of acidic gases.

The gas-liquid contactor for carrying out this invention generally entails an inlet through which flue gases are introduced into a passage, and an ammonium sulfate-containing scrubbing solution that is introduced into a contact region of the passage, where the solution contacts and absorbs sulfur dioxide and other acidic gases from the flue gases. A vessel is fluidically connected to the passage so that the scrubbing solution containing the absorbed acidic gases accumulates in the vessel. Defined within the vessel is a volume from which the scrubbing solution is drawn for recirculation to the passage. An oxygen-containing gas is introduced into the scrubbing solution within the vessel, but separated from the volume so that oxidation occurs primarily in the vessel outside the volume. Finally, an ammonia-containing fluid is introduced into the scrubbing solution prior to being recirculated to the passage. The ammonia-containing fluid is not introduced into the scrubbing solution within the vessel outside the volume, but instead is either introduced directly into the volume or into the recirculating system.

According to the above, oxidation of the ammonium sulfate solution containing an absorbed acidic gas is promoted as a result of the oxidation reaction primarily occurring in a relatively low pH reaction environment, which is physically separated from that portion of the solution to which ammonia is added and the pH is consequently higher. Accordingly, relatively low pH values and low levels of unoxidized ammonium sulfite are present in the oxidation environment within the vessel, but not in that portion of the scrubbing solution to which ammonia is added-accordingly, the added ammonia does not contribute to a high ammonia vapor pressure and, therefore, loss of ammonia from the vessel. Ammonia slip is also reduced by the prevention with this invention of ammonia being carried from the scrubbing solution to the flue gases with the oxygen-containing gas. Another advantage of this invention is that bubbles normally present in the scrubbing solution due to the injection of the oxygen-containing gas are prevented from being drawn into the pump typically used to recirculate the scrubbing solution to the contact section of the gas-liquid contactor.

Other objects and advantages of this invention will be better appreciated from the following detailed description.

BRIEF DESCRIPTION OF THE DRAWINGS

The present invention will now be described, by way of example, with reference to the accompanying drawings, in which:

FIGS. 2 and 3 are schematic representations of gas-liquid contactors in accordance with first and second embodiments of this invention.

DETAILED DESCRIPTION OF THE PREFERRED EMBODIMENT

Figure 2:
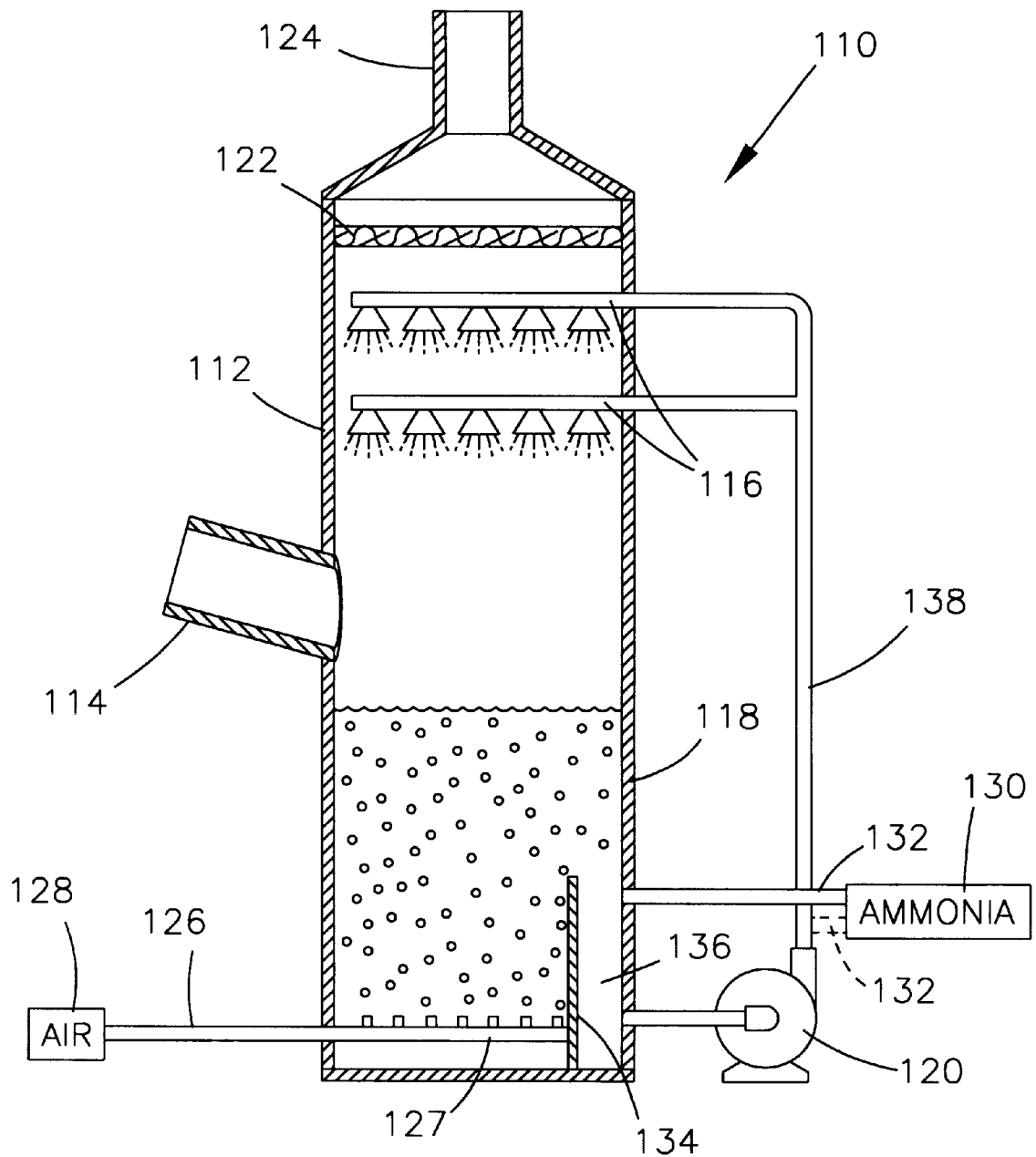

FIGS. 2 and 3 schematically illustrate gas-liquid contactors 110 and 210 configured in accordance with two embodiments of this invention. Each contactor 110 and 210 is configured to absorb sulfur dioxide and other acidic gases from a flue gas using an ammonium sulfate scrubbing solution or slurry (hereinafter referred to simply as "solution" for purposes of convenience), and to react the absorbed sulfur dioxide with ammonia and oxygen to produce ammonium sulfate as a valuable byproduct. While the contactors 110 and 210 are illustrated as being of a particular construction, those skilled in the art will recognize that the teachings of this invention can be applied to structures that differ in appearance from the gas-liquid contactors 110 and 210 of FIGS. 2 and 3, and used in other processes to remove undesirable gases, mist, dust, fumes, smoke and/or particulate matter from a stream of gas.

With reference to FIG. 2, the contactor 110 is shown as including an absorber tower 112 having an upright construction and equipped with an inlet duct 114 through which flue gases enter the tower 112. As is well known in the art, the source of the flue gases may be a process involving the combustion of fossil fuels or various industrial operations by which undesirable gases or particulate matter are produced. Above the inlet duct 114, the tower 112 is equipped with spray headers 116 through which a scrubbing solution is introduced into the tower 112 for intimate contact with the flue gases, resulting in absorption of acidic gases from the flue gases. It is foreseeable that any number of headers 116 could be used, or that the scrubbing solution could be introduced by other devices. As shown in FIG. 2, the scrubbing solution is supplied to the spray headers 116 from a tank 118 at the lower end of the tower 112. The scrubbed flue gases that leave the tower 112 pass through a mist eliminator 122 and are eventually delivered to a stack (not shown) or other suitable equipment through an outlet duct 124, as is known in the art.

In accordance with this invention, the scrubbing solution is an aqueous ammonium sulfate solution containing free dissolved ammonia as the reagent for producing ammonium sulfate as the byproduct of the desulfurization process. As known in the art, the ammonium sulfate solution serves as the liquid vehicle for delivering the ammonia to the tower 112, where the ammonia reacts with the absorbed sulfur dioxide to form ammonium sulfite and ammonium bisulfite. If hydrogen chloride and hydrogen fluoride are present in the flue gas, as is the case with flue gas produced by the combustion of coal, these acidic gases are also captured to form ammonium chloride and ammonium fluoride. Once the solution containing the absorbed acidic gases has fallen into the tank 118, oxygen from a suitable source (e.g., air) is added to the solution to oxidize the ammonium sulfite and bisulfite, forming ammonium sulfate and ammonium bisulfate, the latter of which reacts with ammonia to form ammonium sulfate. Additional ammonia is supplied for this last reaction as well as to increase the pH of the solution to a range of about 5 to 6, so that the solution is highly reactive for high efficient capture of sulfur oxide gases when returned to the spray headers 116.

Figure 1:
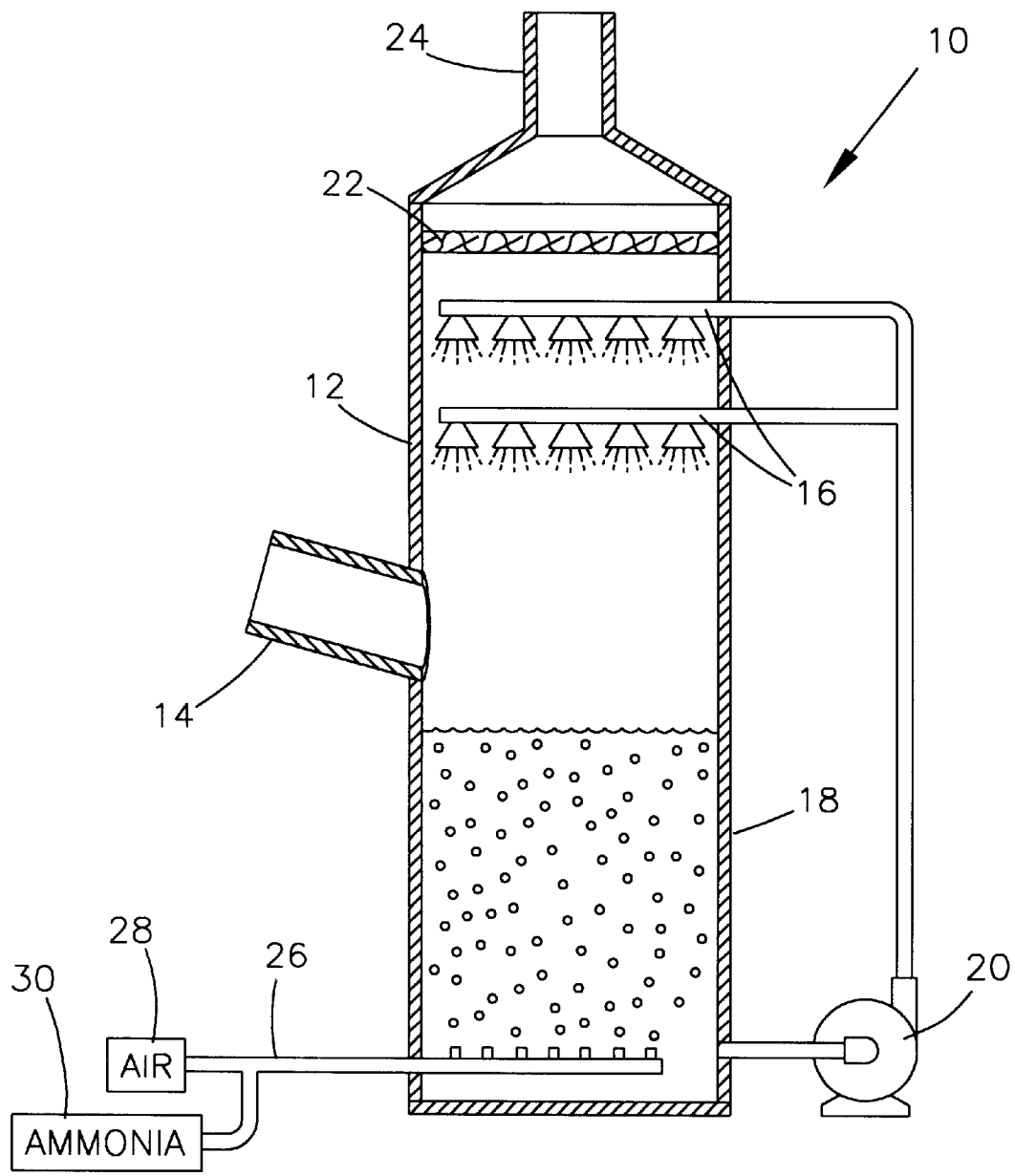
FIG. 1 is a schematic representation of a gas-liquid contactor in accordance with the prior art.

In contrast to the prior art of FIG. 1, which shows air and additional ammonia being delivered together to the tank 18, the present invention provides for the delivery of air and ammonia separately and at different stages of the reaction process that occurs after the absorption of acidic gases from the flue gases. As shown in FIG. 2, air or another suitable oxygen source 128 is sparged or otherwise supplied directly to the tank 118 through a first pipe 126 and an injector 127, while ammonia is supplied from a suitable source 130 through a second pipe 132 to either a baffled section 136 formed by a baffle 134 in the tank 118, or to a pipe 138 through which the solution is recycled by a pump 120 from the baffled section 136 to the spray headers 116. According to this invention, the baffle 134 substantially prevents intermixing of the air and added ammonia within the tank 118, so that oxidation of the solution proceeds without significant interference by the added ammonia and with reduced levels of ammonia slip. Because added ammonia is not present in any significant amounts in the tank 118 outside the baffled section 136, the solution in which oxidation occurs within the tank 118 can be maintained at a relatively low pH, e.g., between 4 and 5.5. The baffle 134 also inhibits the added ammonia from escaping from the tank 118. Because the solution in the tank 118 outside the baffled section 136 has a lower pH, there is a lower driving force for ammonia from the solution to be transferred to the air bubbles added for oxidation. Any ammonia included with the rising bubbles would be carried to the surface of the solution in the tank 118, where the gas in the bubbles would mix with the flue gas and promote ammonia slip. Another benefit of the baffle 134 is that air bubbles are inhibited from being drawn into the pump 120. Because air bubbles rise through the scrubbing solution in the tank 118, the baffled section 136 need only be configured so that the velocity of the solution in the baffled section 136 is sufficiently low to avoid air bubbles becoming entrained in the solution drawn into the baffled section 136. The size of the baffled section 136 and the arrangement of the baffle 134 are preferably configured for each particular application. In general, it will be best to minimize the size of the baffled section 136 while maintaining good distribution of the ammonia added. Minimizing the size of the baffled section 136 serves to maximize the remaining volume of the tank 118 for oxidation. Factors to consider in each design would include the flow rate and number of recirculation pumps used and the form and concentration of ammonia as aqueous or anhydrous.

Ammonia is preferably added to the solution within the baffled section 136 so that the pump 120 mixes the ammonia with the solution to yield a more homogeneous solution at the headers 116. The added ammonia can be in the form of anhydrous ammonia, an aqueous ammonia solution, or as ammonia dissolved in an aqueous solution of one or more salts. Aqueous solutions have the advantage of reducing or eliminating the heat of solution of ammonia, and may be more easily handled and distributed.

A portion of the ammonium sulfate solution and/or ammonium sulfate crystals that form in the solution can be drawn off from the tank 118 to yield the desired byproduct of this reaction. A sufficient amount of ammonium sulfate is preferably removed from the ammonium sulfate solution prior to being returned to the tower 112 in order to maintain ammonium sulfate at a desired concentration in the solution, e.g., about 2% up to the saturation level of ammonium sulfate (about 46 to 48% total dissolved solids, depending on temperature). However, in accordance with copending U.S. patent application Ser. No. 09/149,211, a preferred solution has a dissolved concentration above 46% to about 48% total dissolved solids, so as to have suspended solids of ammonium sulfate precipitate in a range of preferably about 1% to 20% total suspended solids.

The contactor 210 of FIG. 3 differs from that of FIG. 2 by the inclusion of a second reaction tank 244 in which a baffled section 236 is provided that is similar in construction and function to the baffled section 136 of FIG. 2. Otherwise, the contactor 210 has components that can be essentially identical to the components of FIG. 2—namely, an absorber tower 212, an inlet duct 214 to the tower 212, spray headers 216 that introduce an ammonium sulfate solution into the tower 212, a tank 218 at the lower end of the tower 212, a recirculation pump 220 for returning the solution to the headers 216, a mist eliminator 222, and an outlet duct 224. In contrast to the contactor 110 of FIG. 2, ammonia is not added to the tank 218 at the bottom of the tower 212. Instead, the tank 218 is strictly limited to oxidation of the scrubbing solution, which is promoted by the addition of oxygen from a suitable source 228 through a pipe 226A. The at least partially oxidized solution then flows through a pipe 240 into the reaction tank 244, where additional oxygen from any suitable source, e.g., the source 228 via a second pipe 226B, is added for further oxidation of the scrubbing solution. Because complete oxidation is not required to occur in the tank 218, the tank 218 can be sized to match the cross-sectional area of the tower 212. The pipe 240 between the tanks 218 and 244 is preferably connected to the bottom of the tank 218 to ensure that essentially all of the scrubbing solution passes down through the initial oxidation stage within the tank 218.

Ammonia is supplied from a suitable source 230 through a pipe 232 to either the baffled section 236 formed by a baffle 234 in the tank 244, or to a pipe 238 through which the scrubbing solution is recycled by the pump 220 from the baffled section 236 to the spray headers 216. As shown in FIG. 3, air and any other gases that evolve at the surface of the scrubbing solution within the tank 244 are vented to the tower 212 through a pipe 242. These gases may be introduced below the headers 216 to allow scrubbing with the solution, though in practice little if any sulfur dioxide and ammonia would be present in the gases. As with the embodiment of FIG. 2, the baffle 234 substantially prevents intermixing of the air and added ammonia within the tank 244, so that oxidation of the solution within the tank 244 proceeds without significant interference by the added ammonia and with reduced levels of ammonia slip. Therefore, oxidation occurs efficiently within the tank 218, to which ammonia is not added, and in the region of the tank 244 outside the baffled section 236. As with the previous embodiment, the baffle 234 also inhibits the added ammonia from escaping from the tank 244 due to the improved vapor-liquid equilibrium resulting from the solution in the tank 244 but outside the baffled section 236 having a lower pH. The embodiment of FIG. 3 has the advantage of providing better separation between process stages, so that the oxidation reaction is more fully isolated from the added ammonia. Additional reaction tanks could be added in sequence after the tank 244 in order to provide additional separate reaction stages.

In view of the above, it can be seen that a significant advantage of the present invention is that, while prior art desulfurization processes that use ammonia-based scrubbing solutions have been prone to relative high levels of ammonia slip, the present invention controls ammonia slip by way of the manner in which an oxidation gas and ammonia are separately and sequentially introduced into a flue gas desulfurization system to maintain a relatively low pH for oxidation of the scrubbing solution, while providing a relatively isolated region where ammonia is added to promote the subsequent capture of acidic gases with the solution.

While the invention has been described in terms of preferred embodiments, it is apparent that other forms could be adopted by one skilled in the art. For example, the features of this invention could be incorporated within flue gas desulfurization systems that differ from that represented in the Figures, scrubbing solutions could be employed that include constituents in addition to those disclosed, and other and/or additional equipment could be employed to further process the scrubbing solution, as well as process those compounds produced by the flue gas desulfurization system. Furthermore, the function of the baffles 134 and 234 could be achieved by other structures or process modifications, such as direct ammonia injection into the recycle pump suction or discharge piping, or by simply adding the ammonia near the suction of the pump such that the flow to the pump transports the feed ammonia into the pump while avoiding or minimizing contact with the oxidation air, which would tend to carry the ammonia to the surface of the tank and into the flue gas. Accordingly, the scope of the invention is to be limited only by the following claims.

What is claimed is:

1. A gas-liquid contactor comprising:

a passage;

an inlet to the passage through which flue gases containing acidic gases are introduced;

a scrubbing solution introduced into the passage and containing ammonium sulfate, the scrubbing solution contacting the flue gases and absorbing at least a portion of the acidic gases from the flue gases;

a vessel fluidically connected to the passage so that the scrubbing solution containing the acidic gases accumulates in the vessel;

means for introducing an oxygen-containing gas into the scrubbing solution within the vessel;

means for recirculating the scrubbing solution from the vessel to the passage;

means for defining a first volume within the vessel that is separate from a second volume, the defining means being configured so that the first volume contains a quantity of the scrubbing solution that flows from the second volume of the vessel and then into the recirculating means without being recirculated to the second volume, the defining means separating the scrubbing solution within the first volume from the oxygen-containing gas introducing means and separating the scrubbing solution within the second volume from the recirculating means so that the scrubbing solution within the first volume and the recirculating means is substantially free of bubbles of the oxygen-containing gas introduced by the gas introducing means; and means for introducing an ammonia-containing fluid into the scrubbing solution prior to being introduced into the passage, the defining means substantially excluding the ammonia-containing fluid from the scrubbing solution within the second volume of the vessel.

2. A gas-liquid contactor as recited in claim 1, wherein the defining means is a partition within the vessel.

3. A gas-liquid contactor as recited in claim 1, wherein the ammonia-containing fluid introducing means introduces the ammonia-containing fluid directly into the first volume, the defining means inhibiting mixing of the ammonia-containing fluid with the scrubbing solution within the second volume of the vessel, such that the scrubbing solution within the first volume has a higher pH than the scrubbing solution in the second volume of the vessel.

4. A gas-liquid contactor as recited in claim 1, wherein the ammonia-containing fluid introducing means introduces the ammonia-containing fluid directly into the recirculating means.

5. A gas-liquid contactor as recited in claim 1, wherein the passage is substantially vertical, the vessel is at a lower end of the passage, and the scrubbing solution in the passage accumulates in the vessel by falling downwardly through the passage.

6. A gas-liquid contactor as recited in claim 1, wherein the passage is substantially vertical and comprises a tank at a lower end of the passage, the tank being fluidically connected to the second volume of the vessel, which is adjacent and separate from the passage, such that the scrubbing solution first accumulates in the tank and is then transferred to the second volume of the vessel.

7. A gas-liquid contactor as recited in claim 6, further comprising means for introducing an oxygen-containing gas into the tank.

8. A gas-liquid contactor comprising:

a vertical passage;

an inlet to the passage through which flue gases containing sulfur dioxide are introduced;

an ammonium sulfate scrubbing solution introduced into the passage, the scrubbing solution contacting the flue gases and absorbing at least a portion of the sulfur dioxide from the flue gases;

a vessel fluidically connected to the passage so that the scrubbing solution containing the sulfur dioxide accumulates in the vessel;

means for introducing an oxygen-containing gas into the scrubbing solution within the vessel;

means for recirculating the scrubbing solution from the vessel to the passage;

a partition defining a first volume within the vessel that is separate from a second volume, the partition being configured so that the first volume contains a quantity of the scrubbing solution that flows from the second volume of the vessel and then into the recirculating means without being recirculated to the second volume, the partition separating the scrubbing solution within the first volume from the oxygen-containing gas introducing means and separating the scrubbing solution within the second volume from the recirculating means, the scrubbing solution within the first volume being substantially free of bubbles of the oxygen-containing gas introduced by the gas introducing means into the second volume of the vessel; and means for introducing an ammonia-containing fluid directly into the scrubbing solution within the first volume, the partition preventing the ammonia-containing fluid from entering the scrubbing solution within the second volume of the vessel, such that the scrubbing solution within the first volume has a higher pH than the scrubbing solution in the second volume of the vessel.

9. A gas-liquid contactor as recited in claim 8, wherein the vessel is at a lower end of the passage, and the scrubbing solution in the passage accumulates in the vessel by falling downwardly through the passage.

10. A gas-liquid contactor as recited in claim 8, wherein the passage comprises a tank at a lower end thereof, the tank being fluidically connected to the vessel such that the scrubbing solution first accumulates in the tank and is then transferred to the second volume of the vessel, which is adjacent and separate from the tank, the gas-liquid contactor further comprising means for introducing an oxygen-containing gas into the tank.

11. A method comprising:

introducing flue gases containing acidic gases comprising sulfur dioxide into a passage;

introducing an ammonium sulfate-containing scrubbing solution into the passage so that the scrubbing solution contacts the flue gases and absorbs at least a portion of the sulfur dioxide from the flue gases;

accumulating the scrubbing solution containing the sulfur dioxide in a vessel comprising first and second volumes;

flowing the scrubbing solution from the second volume into the first volume and then, without first recirculating the scrubbing solution to the second volume, recirculating the scrubbing solution from the first volume to the passage;

introducing an oxygen-containing gas into the scrubbing solution within only the second volume of the vessel so that the scrubbing solution within the first volume and being recirculated to the passage is substantially free of bubbles of the oxygen-containing gas; and introducing an ammonia-containing fluid into the scrubbing solution prior to being introduced into the passage, the ammonia-containing fluid being substantially excluded from the scrubbing solution within the second volume of the vessel.

12. A method as recited in claim 11, wherein the first and second volumes within the vessel are defined by a partition within the vessel, the partition preventing bubbles of the oxygen-containing gas from entering the first volume.

13. A method as recited in claim 11, wherein the ammonia-containing fluid is introduced directly into the first volume and is prevented from mixing with the scrubbing solution within the second volume of the vessel, such that the scrubbing solution within the first volume has a higher pH than the scrubbing solution in the second volume of the vessel.

14. A method as recited in claim 11, wherein the ammonia-containing fluid is introduced directly into the recirculating means.

15. A method as recited in claim 11, wherein the passage is substantially vertical and the vessel is at a lower end of the passage, such that the scrubbing solution in the passage accumulates in the vessel by falling downwardly through the passage.

16. A method as recited in claim 11, wherein the passage is substantially vertical and comprises a tank at a lower end of the passage, the tank being fluidically connected to the vessel, which is adjacent and separate from the passage, such that the scrubbing solution first accumulates in the tank and then flows into the second volume of the vessel.

17. A method as recited in claim 16, further comprising the step of introducing an oxygen-containing gas into the tank.

* * * * *